United States Patent [19]
Baddour

[11] Patent Number: 5,123,243
[45] Date of Patent: Jun. 23, 1992

[54] METHOD AND APPARATUS FOR TRAPPING AND INCINERATING PARTICULATE MATTER FOUND IN DIESEL ENGINE EXHAUST

[75] Inventor: Raymond F. Baddour, Belmont, Mass.

[73] Assignee: Brehk Ventures, Paramus, N.J.

[21] Appl. No.: 546,403

[22] Filed: Jun. 29, 1990

Related U.S. Application Data

[63] Continuation of Ser. No. 762,623, Aug. 5, 1985, abandoned.

[51] Int. Cl.⁵ .............................................. F01N 3/02
[52] U.S. Cl. ...................................... 60/274; 60/279; 60/288; 60/295; 60/311; 55/283; 55/466; 55/DIG. 30
[58] Field of Search ............... 60/224, 311, 295, 278, 60/279, 296, 288; 55/283, 466, DIG. 30

[56] References Cited

U.S. PATENT DOCUMENTS 4,509,327 4/1985 Enga ...................................... 60/274

FOREIGN PATENT DOCUMENTS 2097283 11/1982 United Kingdom ................. 60/311

OTHER PUBLICATIONS

SAE Paper No. 840079: Hare et al., "Preliminary Particulate Trap Tests on a 2-Stroke Diesel Bus Engine", 3/1984, p. 65.

*Primary Examiner*—Douglas Hart
*Attorney, Agent, or Firm*—Curtis, Morris & Safford

[57] ABSTRACT

A method of removing solid particulate matter from the exhaust of a diesel engine, which comprises passing the engine's exhaust flow through at least a part of filter means to trap solid particulate matter contained initially in the exhaust, thereby to remove said matter from said exhaust flow, interrupting the exhaust flow through at least said part of the filter means, at a time when the preceding period of exhaust flow therethrough is of sufficiently brief duration that the trapped particulate matter has not become resistant to subsequent combustion in the engine, during said interruption backflushing at least said part of the filter means thereby to dislodge from the filter means, and entrain, said solid particulate matter for the purpose of removing it from the filter means, and transporting said dislodged solid particulate matter to the intake of said engine so that said matter can be combusted in the engine; and apparatus for accomplishing same.

10 Claims, 7 Drawing Sheets

METHOD AND APPARATUS FOR TRAPPING AND INCINERATING PARTICULATE MATTER FOUND IN DIESEL ENGINE EXHAUST

This is a continuation of application Ser. No. 762,623 filed Aug. 5, 1985, and now abandoned.

FIELD OF THE INVENTION

The field of the instant invention is reduction of the particulate emission level in diesel engine exhaust, and in a more specific vein methods and apparatus for removal of solid particulate matter found in diesel engine exhaust.

BACKGROUND OF THE INVENTION

Over the past few years, the diesel engine has been relied upon increasingly to power automotive vehicles due to its fuel economy in comparison to conventional gasoline engines. Commercially available diesel engines for highway usage are conveniently classified into two categories, namely, those for use in light-duty vehicles and trucks, and those for use in heavy-duty vehicles. Light-duty vehicles and trucks are defined by the Environmental Protection Agency as passenger cars capable of seating twelve passengers or fewer, and light-duty trucks and all other vehicles under 8,501 pounds gross weight. This category includes most cars and pick-up trucks, mini-vans, and some special purpose vehicles. Heavy-duty vehicles are defined as all vehicles of 8,500 pounds or more gross weight. Heavy-duty vehicles are, typically, trucks, buses, vans and recreational vehicles.

Additionally, the diesel engine finds application in industrial settings such as storage facilities and underground mines, many of which have only limited ventilation. And, diesel engines find further significant utilization in diesel locomotives; industrial applications such as fork lift engines, auxiliary engines on large vehicles, generator and pump service, and in logging, mining, quarrying and oil field operations, as well as well-drilling equipment; construction applications, such as use in bulldozers, motor graders, tractors, scrapers, rollers and loaders; and agricultural applications, such as powering agricultural equipment.

However, despite its rising popularity, especially in the heavy-duty vehicle category, and although diesel engine exhaust (unlike that of gasoline engines) is relatively clean in respect of unburned hydrocarbon- and carbon-monoxide content, several significant difficulties are attendant upon use of the diesel engine. They stem essentially from the fact that diesel engine exhaust contains undesirably large amounts of solid particulate matter, for instance, in amounts at least thirty to fifty times greater than amounts present in the exhaust of a gasoline engine.

Typical solid particulate matter from diesel engine exhaust is made up of small, solid, irregularly shaped particles which are agglomerates of roughly spherical subunits. The particles often have high molecular weight hydrocarbons absorbed on their surfaces, and also may have a liquid coating; frequently, the particulate matter is a complex mixture of pure carbon and hundreds of organic compounds. The particulate is often extremely fine and light with a flour-like consistency. Size distribution ranges from very small single particles of about 0.01 microns to relatively large clusters in the range of 10–30 microns. Illustratively, the particles have a bulk density of 0.075 g/cm$^3$ and have a surface area of 100 m$^2$/g. Generally speaking, the nature of solid particulate matter emitted from turbocharged diesel engines is somewhat different from that of naturally aspirated diesel engines, the former tending to be smaller in size with much lower levels of retained organic compounds.

Unchecked, the aforementioned high level of solid particulate emission in diesel exhaust will continue to compound problems caused by the already high levels of total suspended particulates in the atmosphere, especially in urban areas. For example, as the diesel population increases it can be expected that there will be a decrease in visibility in major cities. Thus, the National Research Council estimates visibility loss in 1990 to be twenty percent in Los Angeles and fifty percent in Denver (*Science*, page 268, January 1982). Moreover, certain characteristic components of diesel exhaust particulate emissions have been identified as carcinogens; their presence in the atmosphere thus creates an evident and unacceptable health hazard. In this connection, the National Cancer Institute has published a study which showed that truck drivers operating diesel vehicles ran a risk of suffering bladder cancer up to twelve times that of the normal population (*Wall Street Journal*, Apr. 11, 1983).

Responding to the above-described situation, the Environmental Protection Agency has proposed a standard for particulate matter emission from diesel-powered light-duty vehicles of 0.6 g/mile, beginning with the 1987 model year; the agency has further proposed (for enforcement beginning with the 1990 model year) a standard for such emissions from diesel-powered heavy-duty vehicles of 0.25 g/bhp-hr (brake horsepower hour).

One of the options which is available to manufacturers of diesel engines and automotive vehicles for combating the aforementioned problem is deliberate suppression of power output in commercially produced diesel engines. Indeed, this technique is simply an extension of methods for controlling smoke and gaseous emissions as previously used by engine manufacturers. Specific examples of such technique are the methods used to minimize (1) acceleration smoke and (2) lugdown smoke.

Acceleration smoke is that generated during vehicle acceleration. It is caused by an undesirably higher fuel-/air ratio and usually manifests itself as a short-duration, black puff. Lugdown smoke is generated during operation under a heavy load, for instance, during hill-climbing. It can conveniently be considered as full-load, steady-state smoke. Manufacturers compensate for these difficulties by mechanically limiting the amount of fuel injected under conditions at which the emissions are generated. Thus, smoke reduction is promoted at the cost of lost performance.

By the foregoing technique, engine manufacturers have made some headway in the endeavor to cut back the solid particulate emissions in the exhaust of such engines. But, although that technique has been somewhat helpful, it is not an adequate solution. That is, the aforementioned expedients are not effective to eliminate all solid particulate emission or even to decrease it to a desirably low level, unless power output is reduced to an unacceptably low level.

Several alternative possibilities for reducing emission levels have been investigated. Prominent among those possibilities are thermal and catalytic oxidation of particulate matter while it is still suspended in the exhaust stream, thermal oxidation of filter-trapped particulate matter, and catalytic oxidation of filter-trapped particulate matter. However, these possibilities generally have associated shortcomings which detract from their suitability as viable commercial solutions.

For example, thermal in-stream oxidation techniques require the provision to the exhaust stream of large amounts of heat energy which is typically unrecoverable. Catalytic in-stream oxidation requires devising a suitable means for introducing catalyst material into the exhaust stream, and preliminarily identification of an appropriate catalyst, both difficult problems which to date have resisted viable solution.

Other of the aforementioned possibilities involve use of a filter to remove solid particulate from a diesel engine exhaust stream. Use of filters has generated a relatively large amount of interest in the art. Experimentation has been conducted with a number of different types of filter materials, notably ceramic materials, stainless steel wire mesh, and the like. Filtration is, of course, a reasonably direct manner in which to remove particulate emission from an exhaust stream. However, use of filters is accompanied by significant difficulties resulting from the tendency of those filters to clog.

For many filtering materials particulate loading is an irreversible process insofar as once loading or clogging has reached a certain point, the filter element must be discarded and replaced since the initial restriction cannot be restored; for such filter elements, cleaning is ineffective. Even if clogging is not allowed to proceed to irreversibility, its occurrence leads to choking off of the exhaust flow through the filter. Since to be effective the filter must be positioned in the exhaust stream, filter-clogging tends to increase the pressure differential across the filter element and impede the exhaust operation—which detrimentally effects operation of the diesel engine. Accordingly, it is necessary, if filtration is to be a practical solution, to remove solid particulate matter which clogs exhaust flow filtering elements, i.e., regenerate the filter.

It is not surprising, therefore, that filter-regeneration, and the concomitant difficulty of disposing of the particulate matter removed from the filter, are central to the above-mentioned filtration techniques. But, while they address filter-regeneration and particulate disposal, the aforementioned techniques are not commercially attractive. For example, thermal and catalytic oxidation of filter-trapped particulate matter to regenerate the filter is problematical inasmuch as the space-, cost- and energy consumption-requirements which are entailed are substantial. These filtration techniques are no more acceptable than the direct, in-stream oxidation techniques which do not make use of filters.

As an indication of the direction the art has taken, see a recent survey and evaluation of the above-discussed proposals—Murphy et al., "Assessment of Diesel Particulate Control—Direct and Catalytic Oxidation", presented at the International Congress and Exposition, Cobo Hall, Detroit, Mich. (Feb. 23-27, 1981), SAE Technical Paper Series, No. 810,112—in which it is stated that the technique apparently holding greatest promise for removal of solid particulate matter from diesel engine exhaust is catalytic oxidation of filter-trapped particulate matter.

Another proposal for removal of solid particulate matter from diesel engine exhaust appears in U.K. Patent Application 2,097,283. That application discloses a method for filtration of exhaust flow, and corresponding apparatus, which involves use of ceramic filter material and no less than two filter zones which are alternately employed for filtering the exhaust stream of an internal combustion engine. The essence of that technique is the filtration of the exhaust stream with one filter zone while simultaneously regenerating the other filter zone by passing an appropriate fluid (e.g., air) through it, in a direction opposed to that of exhaust flow, in order to dislodge trapped solid particulate matter. That regeneration technique is known as backflushing. No quantification of backflushing time is given; it is apparent that backflushing is effected by continuous, relatively long-term passage of backflushing fluid through the filter zone being regenerated.

At a desired time the regenerated filter zone is inserted in the exhaust stream and the other filter zone is subjected to backflushing. In this manner, the filter zones are periodically rotated in an attempt to maintain effective engine operation during filtering.

In order to dispose of the solid particulate matter filtered from the exhaust, it is recycled to the engine for incineration. However, there is no teaching—for example, description of maximum residence time of particulate in the filter during exhaust flow or of the condition of the particulate during that residence time—in the above-identified U.K. Patent Application to guide the practitioner in preserving the solid particulate in a form such that it is suitable for efficient incineration in the engine.

OBJECTS OF THE INVENTION

It is an object of the instant invention to provide a method of removing solid particulate matter from the exhaust of a diesel engine and disposing of that particulate which enables substantial and sustained reduction of solid particulate emission, and also to provide apparatus for accomplishing same.

It is another object of this invention to provide a method for removal of solid particulate matter from diesel engine exhaust and disposal of that particulate which is direct, simple, relatively inexpensive and highly efficient, as well as to provide apparatus for accomplishing same.

It is still another object of this invention to provide a method for filtration-removal of solid particulate matter from diesel engine exhaust which is effective in increasing the efficiency of combustion of recycled solid particulate emission thereby—in combination with filtration of the exhaust stream—to decrease solid particulate levels in diesel engine exhaust.

STATEMENT AND ADVANTAGES OF THE INVENTION

The objects of the instant invention are achieved as follows.

In one of its aspects, the present invention is in a method for removing solid particulate matter from the exhaust of a diesel engine. In accordance with the method, the engine's exhaust flow is passed through at least a part of filter means to trap solid particulate matter contained initially in the exhaust, thereby to remove said matter from said exhaust flow. The exhaust flow through at least said part of the filter means is interrupted, at a time when the preceding period of exhaust flow therethrough is of sufficiently brief duration that the trapped particulate matter has not become resistant to subsequent combustion in the engine. During said interruption at least said part of the filter means is backflushed thereby to dislodge from the filter means, and entrain, the trapped solid particulate matter for the purpose of removing it from the filter means. The dislodged solid particulate matter is transported to the intake of said engine so that said matter can be combusted in the engine.

In another of its aspects, the present invention resides in apparatus, in a diesel engine, for decreasing exhaust emission. That apparatus comprises filter means which is adapted to intercept the engine's exhaust flow and which traps solid particulate matter contained initially in the exhaust when that exhaust flows through at least a part of said filter means, thereby to remove said matter from said exhaust flow. The apparatus also comprises means for interrupting the exhaust flow through at least said part of the filter means at a time when the preceding period of exhaust flow therethrough is of sufficiently brief duration that the trapped particulate matter has not become resistant to subsequent combustion in the engine. The apparatus further includes means for passing, during said interruption, backflush fluid through at least said part of the filter means thereby to dislodge from the filter means, and entrain, said solid particulate matter for the purpose of removing it from said filter means; and means for transporting said dislodged solid particulate matter to the intake of said engine so that said matter can be combusted in the engine.

Numerous advantages accrue to the practitioner of the instant invention. The present method and apparatus embodiments, through trapping of solid particulate matter of the exhaust in a filter material, and removal of the trapped particulate from that material in a condition lending itself to combustion, enable reduction of solid particulate emission levels in diesel engine exhaust to an insignificant level. This obviates the need to suppress potential power output of the engine in order to reduce emission levels; hence, a significantly increased utilization of the diesel engine's potential power output is enabled. Furthermore, the present invention provides a method and apparatus for controlling solid particulate emission which are direct, simple, relatively inexpensive and efficient through the use of widely available filtration materials and the elimination of the need to introduce large amounts of thermal energy, catalytic agents and the like into the filtering system. Additionally, the present invention, through the timely employment of backflushing, effects a regeneration of the filter material utilized. The instant invention is, therefore, a substantial technical and commercial advance.

In the following sections, the invention is described in greater detail to illustrate several of its preferred embodiments.

DESCRIPTION OF CERTAIN PREFERRED EMBODIMENTS

The present invention is suitable for use in conjunction with both naturally aspirated and turbo-charged diesel engines of all sizes, but especially with larger turbo-charged diesel engines utilized in heavy-duty vehicles, such as trucks, buses and the like, or in heavy industrial applications of the sort in which solid particulate emissions are especially high and especially intolerable due to poor ventilation or the like.

The principal criterion of success with the present invention (as with all filtering systems for combustion engine emission) is the attainment of the desired radical minimization of solid particulate emission levels under conditions of steady-state operation conducive to commercial, automotive and other industrial applications. Put another way, filtering methods and apparatus which involve a filter element that irreversibly (even if gradually) clogs to a level beyond that at which the filtration is compatible with effective engine operation, or the utilization of which results in the collection of solid particulate emissions elsewhere in the system until efficient operation of the engine is foreclosed, are not capable of sufficiently long-term operation to make them feasible solutions to the pollution problems discussed hereinabove. By way of example, those of ordinary skill in the art can readily appreciate that particulate emission clogging of a filter element or trap will result in an unworkably large increase in pressure differential across the trap, thereby introducing into the system an unacceptably high backpressure so as to impede the operation of the engine itself. Accordingly, the desideratum is to achieve equilibrium, i.e., a condition in which the amount of particulate emission from the engine is equivalent to an amount which is disposed of in a manner minimizing atmospheric pollution to the greatest degree possible. Pollution minimization in accordance with the instant invention is accomplished by returning the solid particulate matter (except for the amount which accumulates in the system itself) to the engine for combustion (incineration). Hence, design choices made in the course of implementing utilization of the invention will be geared toward maintaining the particulate emission inventory in the system at a feasibly low level and maximizing the amount of particulate emissions returned to the engine and there incinerated.

A fundamental aspect of the present invention is the recognition that solid particulate matter trapped by filter material through which diesel engine exhaust is passed cannot be allowed to remain on the filter material for an indefinite amount of time during exhaust flow without a significant loss in the efficiency of incineration of recycled particulate in the engine. That is to say, if trapped particulate is allowed to accumulate in the filter material for too long a period of time it becomes resistant to incineration in the engine after such particulate is dislodged from the filter material and transported back to the engine's combustion chamber. It appears likely that such resistance stems from the conditions to which the trapped particulate is subjected before removal from the filter material. One of these conditions is elevated temperature due to the relatively high temperature of the exhaust stream passing through the filter material. This elevated temperature condition probably results in chemical reactions at the surfaces of the trapped particles (e.g., oxidation) causing there to be a "crust" or coating which is resistant to combustion conditions in the diesel engine and thus decreases the efficiency of incineration of recycled trapped particulate. Another condition to which trapped particulate is subjected is constant contact with gaseous and solid components of the exhaust stream. Such contact is likely to result in the gradual enlargement of the individual particles due to deposition of additional material on their surfaces and/or to particle agglomeration. Increased particle size would have the effect of increasing the difficulty of combustion and thus decreasing incineration efficiency. And, at least as importantly, is the apparent adverse effect on ease of incineration of the particulate's graphitization, i.e., conversion from an amorphous carbon form to a far less combustible (crystalline) graphite form. It will be appreciated, of course, that the reason or reasons for the increased resistance to combustion of trapped particulate as a function of residence time in the filter material are not known with certainty. The foregoing explanations are voluntarily offered in the spirit of giving as full a description of the invention as possible.

In any event, the efficiency and completeness with which recycled trapped solid particulate is incinerated in the engine is a function of the freshness of the solid particulate material when it is recycled to the engine. The guiding consideration in this regard is, therefore, the interruption of exhaust flow through the filter material in question before particulate matter trapped therein has been subjected to exhaust stream conditions for a time sufficient to make its resistance to incineration upon recycling unacceptably high for commercial operation of a diesel engine. It will be appreciated by the skilled artisan that the period of time for exhaust flow during which the trapped particulate can be permitted to reside in the filter material, without the particulate's undergoing a change making it significantly more incineration-resistant such that the commercial feasibility of the particulate filtering and disposal arrangement is diminished or lost, will vary from system to system—depending on system configuration, speed and amount of exhaust flow, exhaust pressure and temperature, and the like. However, the skilled artisan will be able, using the teachings herein, to determine for any particular system maximum and preferred periods of exhaust flow through a trap without undue experimentation. Generally speaking, from a "freshness" standpoint the preferred practice is to interrupt exhaust flow after as short a time as feasible, i.e., "the sooner, the better." Of course, it is readily appreciated that, especially in commercial applications, this must be balanced against other operational constraints and considerations, but that practice is advantageously followed to the extent possible. Accordingly, in an illustrative embodiment, trapped solid particulate matter is not allowed to reside in the filter material in question during exhaust flow through that material for more than one hour. Preferably, the time of exhaust flow is no more than about 0.5 hour. It is especially advantageous if the residence time is no more than about 10 minutes. As can be seen, observance of these guidelines requires the frequent substitution of a regenerated filter material for that containing trapped solid particulate matter, in order that the trapped particulate remain acceptably combustible. Accordingly, it is important in practicing the present invention that its method and apparatus embodiments be adapted for meeting the requirement of frequent substitution.

One important point to consider is the filter element or trap which is utilized to remove solid particulate matter from the exhaust stream emitted by the engine. Suitable materials for filtering the exhaust stream in accordance with the invention are ceramic honeycomb, sintered metal particles, coated and uncoated metal mesh, ceramic fiber, ceramic foam, and packed beds. Of these, ceramic honeycomb and sintered metal particle materials act as surface filters inasmuch as particles larger than the effective pore size of the honeycomb are normally collected on its upstream surface. In contrast, the other four filter media can be considered to function as depth filters because particle removal is not limited to the surface, but is continuous throughout part or all of the filter material's thickness or depth.

In a ceramic honeycomb filter solid particles larger than the approximate mean pore size of the material are intercepted at the material's surface and prevented from passing through the material. As particles collect on the surface, the effective pore size is reduced which, in turn, leads to an increased efficiency as smaller sized particles are collected. In general, ceramic honeycomb traps have three stages of activity: first, a period of relatively rapid back pressure increase, most likely resulting from early pore plugging and initial cake formation on the upstream surface of the filter material; second, a prolonged period characterized by a relatively constant loading slope; finally, a shorter period during which back pressure again increases rapidly, probably due to complete plugging of many cells. Illustratively, the leading one inch or so of the filter material, when used in a typical filter assembly (see FIG. 1 or 2, described hereinafter) usually becomes more heavily loaded than does the remainder of the filter which carries only a lighter and relatively uniform film of the solid particulate filtrate.

When using ceramic honeycomb filter material it is, therefore, necessary to take into account its propensity for causing an agglomeration of a large portion of the particulate material at the upstream side of the filter material, in addition to the exposure of the particulate material (in general) to the rather severe exhaust conditions, in determining how short the duration of exhaust flow through the filter material should be in accordance with the invention.

Sintered porous metal filter materials are advantageous in that they exhibit the structural integrity, corrosion resistance and temperature resistance required in certain embodiments of the invention. These materials are made typically by precompacting and then sintering stainless steel, nickel-base and other types of alloy metal powders. They are commercially available, for instance from Mott Metallurgical Corporation, and are well-adapted to regeneration (i.e., cleaning) in accordance with the present invention. Their "re-entrainment" characteristics can be highly useful in removing trapped particles with a relative minimum of difficulty. Since these sintered metal materials are also surface filters, their use (like that of ceramic honeycomb materials) requires provision for the combined effects of particle agglomeration and high temperature as contributors to the increasing of resistance to incineration in the diesel engine.

Of course (as will be appreciated), although other useful filter materials do not apparently function as surface filters (in contrast to ceramic honeycomb and sintered porous metal materials), the present invention also finds application to the use of such materials because particulate matter trapped in them also becomes disadvantageously resistant to incineration if not removed from the exhaust flow within an appropriate time period. Thus, discussion of various other filter materials which can be utilized in the invention is in order.

In both wire mesh and ceramic fiber filter materials, the primary trapping mechanisms are impaction and diffusion. That is, during operation larger particles collide with the filaments of the mesh or fiber material and adhere to filament surfaces, or to particles already collected on those surfaces. Additionally, some smaller particles migrate by diffusion to the surface of the mesh or fiber material or to previously collected particles, and are also retained in the filter. Mesh and fiber traps of this sort are advantageous in that the back pressures attendant upon their use are relatively low. While their tendency to exhibit a "blowoff" phenomenon—that is, a reentrainment in the exhaust stream of previously collected particles—can be somewhat disadvantageous, its controlled occurrence operates to advantage in certain embodiments of the present invention, as controlled reentrainment is a desideratum. In an alternative embodiment metal mesh filter material is coated with activated alumina which provides a highly porous surface structure of large surface area. Additionally, the porous surface tends to disrupt boundary layer flow thereby encouraging diffusion to the mesh filament. The foregoing result in increased collection efficiency and holding power.

Ceramic foam filter materials, such as silica foam materials, are also useful. These materials provide a three-dimensional, open pore network which collects solid particulate matter efficiently. The main trapping mechanisms are interception and diffusion. In general, trapping efficiency increases as the number of cells per linear inch and depth increases. Pressure drop across the ceramic foam filter increases with cell number and depth, but substantially decreases with increasing cross-sectional area for a given volumetric flow rate. Dislodgment of trapped particles in accordance with the present invention is in many instances more difficult when employing a ceramic foam material; however, in some embodiments, this difficulty is more than offset by the decreased back pressure attendant upon use of ceramic foam material in comparison with ceramic honeycomb material, due to the fact that cell size in the ceramic foam materials is often larger than the pore size in ceramic honeycomb structures.

Granular bed filters lend themselves to practicing of certain embodiments of the invention. They are particularly interesting for their capacity to function either in a stationary or fluidized mode. It follows that the granular bed can be operated in a stationary mode during loading or trapping to enhance collection efficiency, and then be operated in a fluidized mode during cleaning to enhance dislodgment and reentrainment. This benefit is a result of the fact that penetration in a moving bed is usually significantly higher than penetration in an otherwise equivalent stationary bed, the increase being attributable to better reentrainment through mechanical agitation in the fluidized mode. In an advantageous embodiment, collection efficiency of a stationary granular bed is increased by the intergranular deposits in the bed, that is solid particles which become lodged during filtering; the bed operates as a graded media filter, larger particles typically being collected on granules at the bed's surface and smaller particles collected within the bed's pores by an increasingly dense deposit. Shallow beds are favored because they can be designed to provide high collection efficiency with relatively low back pressure and easy dislodgment and reentrainment.

An especially preferred filter material, and as appears from the foregoing one with which the present invention is quite advantageously employed, is a ceramic honeycomb unit typically fabricated of a porous cordierite ($2MgO-2Al_2O_3-5SiO_2$), but is also acceptably made of any other ceramics, such as mullite, alumina, forsterite, aluminum titanate, mullite and aluminum titanate, spinel, zirconia and spinel, calcia partially stabilized zirconia, and alumina and silica. Units fabricated of the foregoing materials which are suitable for the invention typically have physical features such as, cell density, porosity, mean pore size, coefficient of thermal expansion, and compressive strength corresponding to those of commercially available units of such materials employed in filtering particulate from diesel engine exhaust. The overriding requirements are that the material has the necessary mechanical strength, chemical resistance, thermofracture resistance, and melt resistance to survive effectively in the hostile environment presented by diesel engine exhaust.

Figures 1, 2:
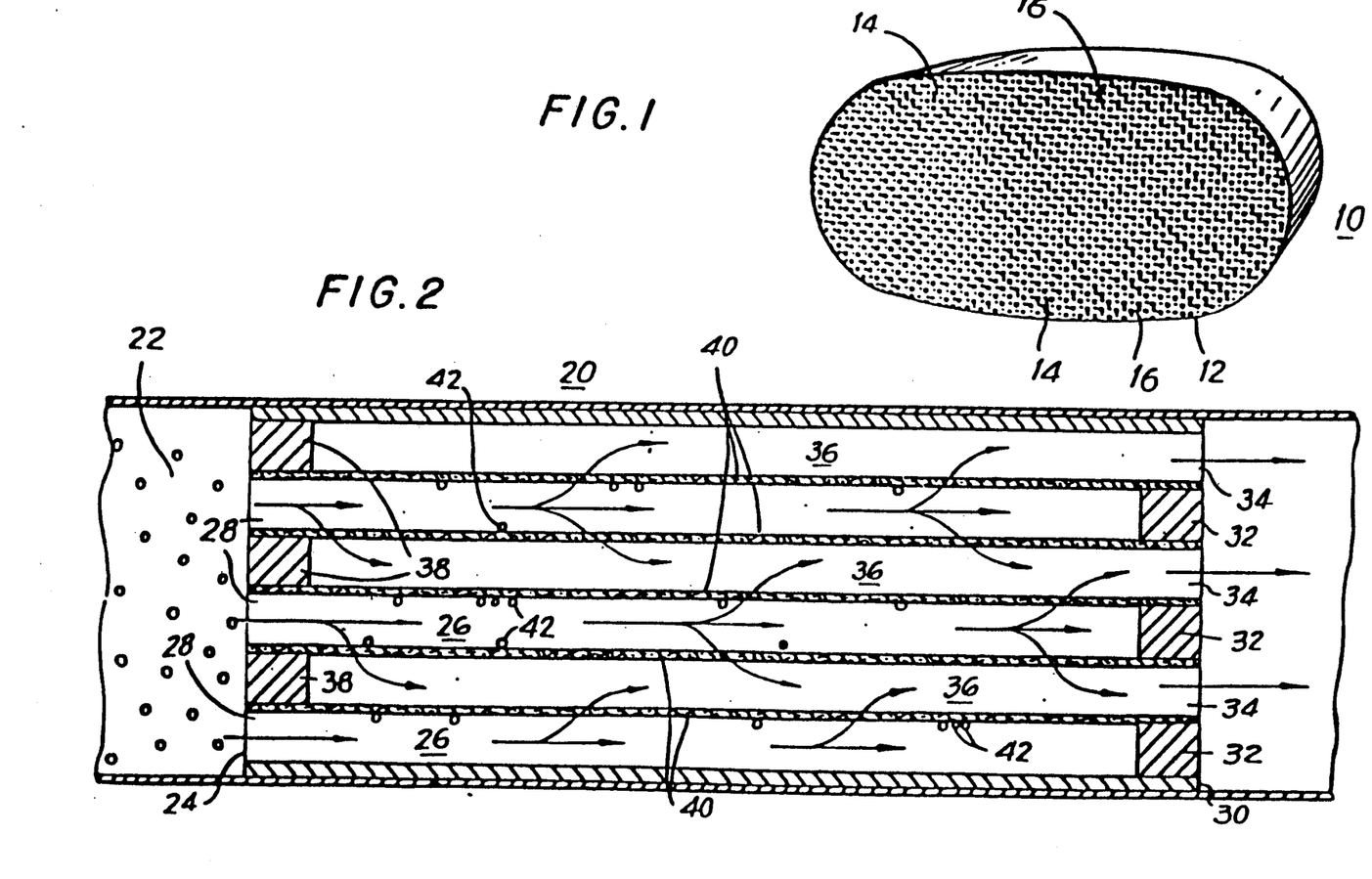
FIG. 1 is a perspective view of a "ceramic honeycomb" filter element suitable for practicing the invention.
FIG. 2 is a schematic view of several individual passages within the filter element of FIG. 1.

In FIG. 1 there is depicted one type of ceramic honeycomb filter unit suitable for practicing of the present invention. The unit 10 has a monolith face 12. On the face, openings 14 alternate with solid ceramic plugs 16 to form a checkerboard arrangement. The openings permit ingress to and egress from parallel channels which extend the entire length of the unit. These openings are typically square in shape, but are suitably otherwise configured to be circular, elliptical, etc. The channels terminate at the opposite end of the unit (not shown), and are blocked at that end by ceramic plugs so as to create a set of blind passages. The opposite end of the filter unit is also made up of alternating pores and ceramic plugs. The pores in the opposite end permit ingress to and egress from a corresponding parallel set of channels running the entire length of the unit and terminating in ceramic plugs 16 in face 12. Thus the ceramic channels opening at the opposite end of the filter unit 10 provide another set of parallel blind passages, and are situated in the filter unit to alternate with the blind passages which open on face 12.

FIG. 2 schematically depicts channel arrangement 20 of the type shown in FIG. 1. Particulate laden exhaust 22 is directed at the upstream face of the unit 24. The exhaust enters blind channels 26 through openings 28 in the upstream face of the unit. Channels 26 are blocked at the downstream face 30 by ceramic plugs 32. At the downstream face 30, openings 34 permit ingress to and egress from channels 36. Those channels are closed at the upstream face 24 by ceramic plugs 38. Channels 26 and 36 are separated by common walls 40. These common walls are sufficiently porous to permit passage of exhaust gas; however, the wall pores are sufficiently small to prevent passage of the vast majority of solid particulate matter in the exhaust. Thus, as can be seen from the arrows in FIG. 2, exhaust gas carrying solid particulate matter enters openings 28 and passes along channels 26. Solid particles 42 are trapped on the walls of the channels 26 while the gas passes through the porous walls and proceeds along channel 36 to openings 34 where it is released downstream of the filter unit. Plugs 38 at the upstream face 24 of the filter unit prevent passage of the particulate laden exhaust into channels 36 directly. Correspondingly, plugs 32 prevent escape of particulate laden exhaust at the downstream face 30 of the unit.

In order to clean the filter unit depicted in FIGS. 1 and 2, backflush fluid is passed through such unit in a direction opposite that of the aforementioned exhaust. Thus, the backflush fluid first encounters what is normally downstream end 30 of the unit, passes through openings 34 and into channels 36, diffuses through common walls 40, dislodges particles 42 from the common walls in channels 26, entrains those particles and carries them along channels 26 through openings 28 and out of the trap. In this manner, the trap is cleaned, that is regenerated.

In certain preferred embodiments of the invention, particularly its application to automotive uses, the collection efficiency of the trap must be balanced against, and not accomplished at the expense of, excessive introduction of back pressure in the exhaust system. In such cases, it is advantageous to design the trap and associated exhaust system to maintain back pressure at as low a level as possible. As is readily understood by those of ordinary skill in the art, increasing the pressure drop across the filter unit is accompanied by increasing back pressure in the exhaust system. Backpressure has a direct and detrimental effect on the operation of the invention, and its occurrence should be minimized whenever possible. Pressure drop can be maintained at lower levels through the choice of appropriate design features. Illustratively, it is a function of cell geometry, wall properties and volume of a ceramic filter unit. Those features are advantageously set such that a balance is struck between minimizing pressure drop and maintaining the required filter efficiency.

It is important to note that practicing of the instant invention frees the skilled artisan from filter design constraints which would otherwise be imposed upon him due to the use of conventional regeneration techniques. For example, consider regeneration processing which involves burning of soot and other solid particulate matter trapped in the filter unit. In such processing the filter must be configured in order to obtain regeneration times and peak pressures which fit within desired ranges for engine and/or environmental requirements. Another requirement which ordinarily presents difficulty is the need, in automotive applications, to design the filter so that its material exhibits structural integrity for the useful lifetime of the vehicle.

Conventional technique for soot-disposal involving burning collected soot off the filter places an even greater physical demand on the filter than the conditions it is normally subjected to in the course of filtering exhaust. That is to say, burning of accumulated soot and other solid particulate matter during regeneration releases a large amount of energy and generates a rapid temperature rise. Moreover, that temperature rise is not necessarily evenly distributed throughout the filter unit, thereby setting up thermal gradients in both radial and axial directions. Additionally, excessive buildup of solid particulate matter can result in release of an excessively large amount of energy upon burning, thus subjecting the material (e.g. ceramic material) of the filter unit to temperatures exceeding its melting point.

Since with the instant invention regeneration is accomplished without the use of ignition of trapped solid particulate matter in the filter unit, the foregoing problems are eliminated. Attainment of the stated objective of providing method and apparatus for removal of solid particulate matter from diesel engine exhaust which are direct, simple, relatively inexpensive and highly efficient is manifest.

Once trapped by the filter unit during exhaust flow therethrough, solid particulate matter is advantageously removed from the filter by passing backflush fluid through the filter unit in a direction opposite to that of the exhaust flow. It is a concomitant advantage of backflushing that the fluid also serves as a medium in which dislodged particles are entrained and carried back to the engine for incineration. Accordingly, in order for particle dislodgment to be carried out successfully so as to reduce system backpressure and renew filter efficiency, the separation forces exerted by backflush fluid must be in excess of the forces by which solid particulate matter adheres to the filter material. In addition to any direct mechanical forces that might result from flow reversal (depending on the filter material), movement of the backflush fluid stream in the immediate vicinity of trapped particulate matter is significant. Generally, in order to initiate particle movement the particle must receive energy from an external source, for instance from the impact of another particle or object or from drag forces of the moving backflush fluid stream past the exposed profile of the particle. A convenient way of looking at this phenomenon is that the backflush fluid must be composed of a sufficient amount of fluid colliding with and passing through the filter unit at a sufficient velocity to dislodge trapped particles. It can, of course, be readily appreciated by those of ordinary skill in the art that the backflushing requirements will vary from system to system and filter unit to filter unit depending on size, configuration and the like. However, equipped with the teachings of this application, and knowledgable of the parameters and dimensions of his particular system, the skilled artisan will be able to determine without undue experimentation the extent of backflushing necessary to practice the instant invention.

As can be appreciated, backflushing is suitably effected in more than one different way. Typically, backflushing is accomplished by a continuous passage, during the backflushing or regeneration period, of fluid through the filter material in a direction opposite that in which the exhaust stream flows. This is referred to herein as continuous backflushing. However, the present invention is equally applicable to pulsed backflushing systems. The concept of pulsation is understood in the art, and normally refers to the generation of one or more impulses or surges of fluid having sufficiently great power so that when the impulse or surge strikes and passes through the filter unit the particles residing in the trap are dislodged. In such an embodiment, the backflush fluid pulse is conveniently viewed as being composed of a sufficient amount of fluid colliding with and passing through the filter material at a sufficient velocity to discharge trapped particles. Alternatively, the pulse can be viewed as a wave; the pulsed backflushing must be of sufficient power (i.e., a sufficient amount of energy must pass by some point in the filter unit per unit time) to dislodge trapped particles. Yet another way of conceptualizing this phenomenon is that the change in pressure at any one point in the filter unit due to the passage of the wave therethrough should occur in an amount of time which is sufficiently short that the fluid pulse is capable of dislodging trapped particles. A detailed description of certain pulsed backflushing embodiments is set forth in application Ser. No. 708,260 filed Mar. 5, 1985 and naming as inventors, Charles D. Wood et al. In any event, it is readily appreciated that the present invention finds wide application to embodiments involving filter-backflushing and subsequent recycling of the dislodged trapped particulate, and that the mode of backflushing is not critical to the functioning of the invention.

Backflushing fluid flow is suitably generated in any convenient manner which lends itself to utilization in the particular environment to which the invention is applied. Preliminarily, it is important to note that, while ambient air presents a convenient and highly useful backflushing fluid, the fluid is not necessarily limited to same. Alternatively, the fluid is suitably any one which can be passed through the filter material so as to dislodge trapped particles, and the presence of which does not otherwise interfere with or detrimentally affect the operation of the engine system. Oxygen, or an inert gas such as nitrogen, is an example of a suitable alternative fluid. (Of course, as will be apparent from the following, if a backflushing fluid not containing oxygen is used to dislodge the particles and transport (by means of entrainment) the particles back to the engine, then the engine is advantageously supplied with oxygen from another source in order that combustion be optimized.)

In an especially advantageous embodiment of the invention, backflushing is generated by inducing a vacuum condition, or at least very low pressure, in the exhaust system on the upstream side of a particulate-laden trap, to draw backflush fluid into the vacuum or low pressure volume such that a sufficient mass thereof passes through the trap at sufficient velocity to dislodge trapped particles. An especially advantageous manner in which to accomplish this is to employ the intake pull of the engine to draw down the pressure on the upstream side of the trap or filter unit in question.

Alternatively, the backflushing is accomplished by directing a pressurized fluid, for instance compressed gas (illustratively, air), through a trap to be cleaned. The fluid is acceptably drawn from a pressurized container or other suitable source; conveniently, compressed air drawn from the hydraulic or turbo-charging system of a diesel-powered vehicle will do. The compressed gas is injected into the exhaust system on the downstream side of the filter unit or trap so as to flow through the trap in a direction which is the reverse of that taken by the exhaust flow during normal filtering operations. Again, the compressed gas is injected into the system during interruption of normal exhaust flow. The compressed gas must be of sufficient mass and traveling at sufficient velocity to dislodge the particles trapped in the filter unit.

With the foregoing examples in mind, it is readily appreciable to the skilled artisan that any other suitable manner of drawing or forcing backflush fluid through the trap in a direction opposite to that taken by the exhaust flow can be utilized, the principal criteria of selection being only that the means employed is sufficient to dislodge trapped particles and it does not unduly interfere with the engine's operation.

In addition to providing a means for dislodging trapped particles from the filter unit for purposes of cleaning same, it is necessary in accordance with the present invention to transport those particles back to the diesel engine for incineration. This is typically accomplished by entraining the particles in a fluid stream conducted through a line of the exhaust system leading to the engine's air intake apparatus. After initial dislodgment, the dislodged particles are in very short order brought under the influence of the flow of the aforementioned fluid stream. That flow must be sufficient to maintain "floatation", that is, keep the particles free from recapture by the trap or filter unit, until they leave the unit. Recapture is disadvantageous in that it lowers the efficiency of the regeneration operation during the cleaning cycle.

In an advantageous refinement of the present invention the backflush fluid employed to dislodge trapped solid particulate matter is also utilized as an entrainment vehicle, i.e. a carrier, for the dislodged particulate matter in order to transport same back to the diesel engine. Typically, the backflush fluid is air, the oxygen component of which is sufficient, upon reaching the engine along with the particles entrained in the air, to enable the incineration (oxidation) of those particles.

It should be realized that the present invention is suitably practiced by using one filter zone, or a plurality of filter zones, each comprising a suitable filter material. Normally, when the practitioner determines that it is advantageous or otherwise desirable to conduct exhaust filtering and filter regeneration as separate operations, such that performance of one is not mutually exclusive of the other, two or more filter zones are utilized. The filter zones suitably are different portions of a single filter element; alternatively two or more different filter elements (each having one or more different filter zones) can be used. With the multiple filter zone arrangement the exhaust stream is passed through at least one zone, while at the same time at least one other zone is being backflushed (e.g. by passage of the engine's intake stream through it). After a period of exhaust flow through the zone(s) which is not so long that trapped particulate becomes undesirably incineration-resistant (as previously discussed), the exhaust stream's flow to that zone is interrupted. The zone(s) can then be regenerated by backflushing, while if desirable one or more already-regenerated filter zones can be inserted in the exhaust stream to replace (in part or in whole) the filter zones removed for regeneration. In another embodiment, the invention is applicable to a system employing a single filter zone only. Such an arrangement has clear advantages in terms of minimization of filter material, valving, conduit and like expenses. In such an arrangement exhaust flow through the filter material is interrupted for a period of time during which a suitable backflushing fluid is passed through the filter in a direction opposite that of exhaust flow; the filter is at all times left in the exhaust line, a measure which confers a high degree of simplicity on the system.

In accordance with the foregoing a more specific embodiment of the invention comprises the steps of passing the engine's exhaust through at least one of the filter zones of filter means having a plurality of filter zones to trap solid particulate matter contained initially in the exhaust and thereby to remove it from the exhaust, while reserving at least one other of said filter zones such that the exhaust flow is not passed through it; interrupting exhaust flow through at least one said filter zone through which exhaust flow is being passed, at a time when the preceding period of exhaust flow therethrough is of sufficiently brief duration that the trapped particulate matter has not become resistant to subsequent combustion in the engine; re-directing exhaust flow through at least one said reserved filter zone; backflushing said at least one filter zone through which exhaust flow has been interrupted for a period of time effective to dislodge therefrom, and entrain, trapped solid particulate matter for the purpose of removing it from said filter zone, thereby regenerating the filter zone; and transporting said dislodged solid particulate matter to the intake of said engine so that said matter can be combusted in the engine.

A corresponding apparatus embodiment comprises filter means having a plurality of filter zones which means is positioned so that exhaust flow from the engine is passable through each of its filter zones to trap solid particulate matter contained initially in the exhaust flow, thereby to remove said solid particulate matter from the exhaust. The filter means is adapted so that exhaust flow passes through at least one of its filter zones while there is reserved at least one other of such filter zones such that exhaust flow is not being passed through it. Further, there is means for interrupting exhaust flow through at least one of the filter zones during the passage of exhaust flow through the zone, at a time when the preceding period of exhaust flow therethrough is of sufficiently brief duration that the trapped particulate matter has not become resistant to subsequent combustion in the engine. Also included are means for re-directing exhaust flow to at least one said reserved filter zone, and means for backflushing each such filter zone through which exhaust flow has been interrupted, thereby to dislodge from each such filter zone, and entrain, solid particulate matter trapped in the zone for the purpose of removing it from said zone. Additionally, the apparatus contains means for transporting said dislodged solid particulate matter to the intake of said engine so that said matter can be combusted in the engine.

A yet more specific embodiment of the foregoing apparatus has the following added features. The filter means as aforesaid has two filter zones. The apparatus also includes means for directing exhaust flow alternately to said filter zones, adapted to re-direct exhaust flow from one filter zone to the other in conjunction with an interruption of exhaust flow through the former zone. Their is means for continuously backflushing each of said filter zones which is adapted to effect backflushing of the filter zone through which exhaust is not passing. Also, there is means for correspondingly interrupting backflushing of the other of the filter zones.

In a preferred form of each of the immediately preceding method or apparatus embodiments, as well as the other embodiments of the invention herein disclosed, the sequence of steps is repeatedly performed or the apparatus is adapted for repetitious performance—to effect continual regeneration of each filter zone when it is in turn backflushed.

Further objects and features of the invention will be apparent from the following.

Figure 3A:
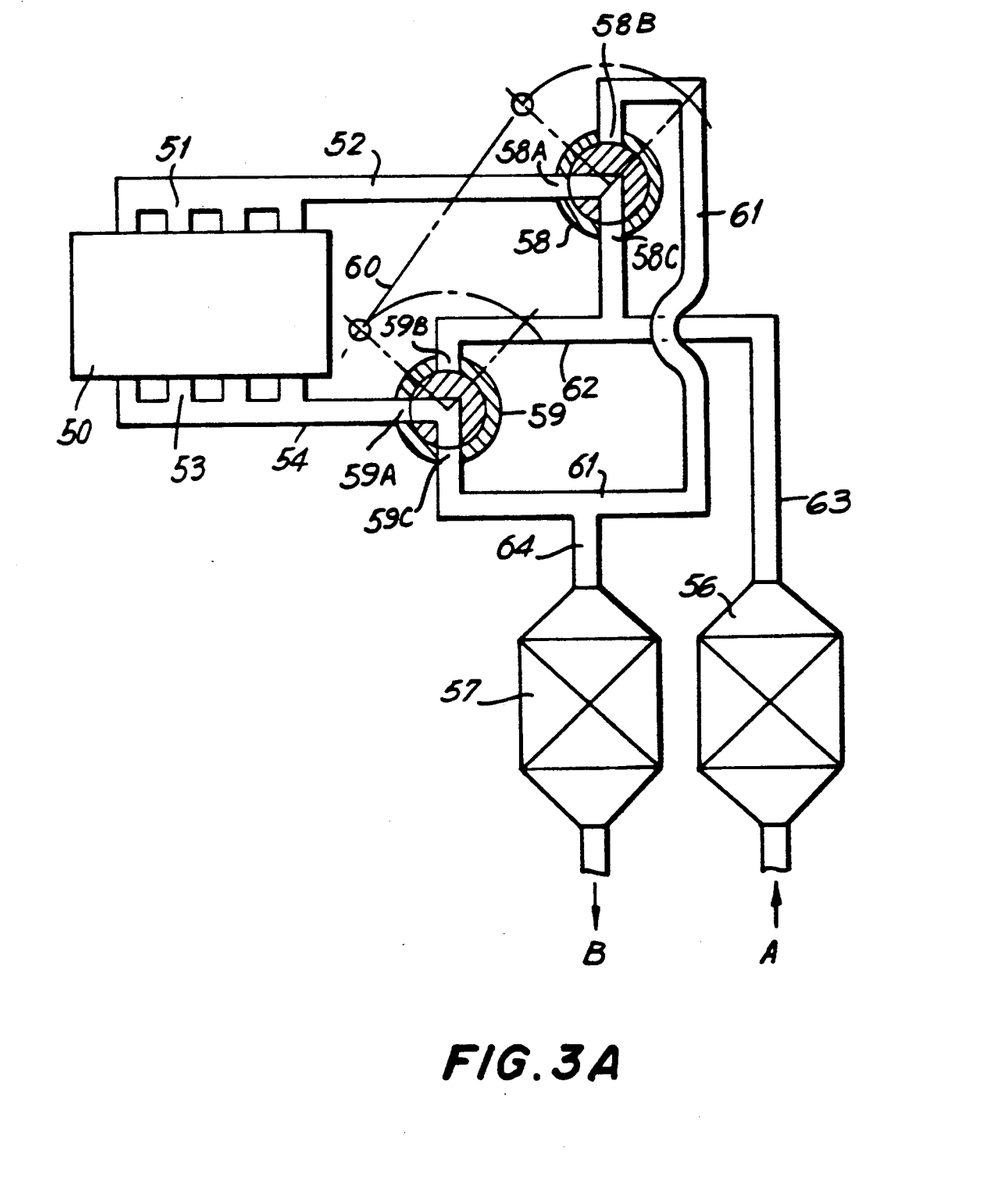
FIG. 3 is a schematic view of one embodiment of the invention, namely, a diesel engine exhaust gas filter arrangement employing continuous backflushing, adapted for recycling, to the engine for incineration of "fresh" solid particulate removed from the exhaust.
Figure 3B:
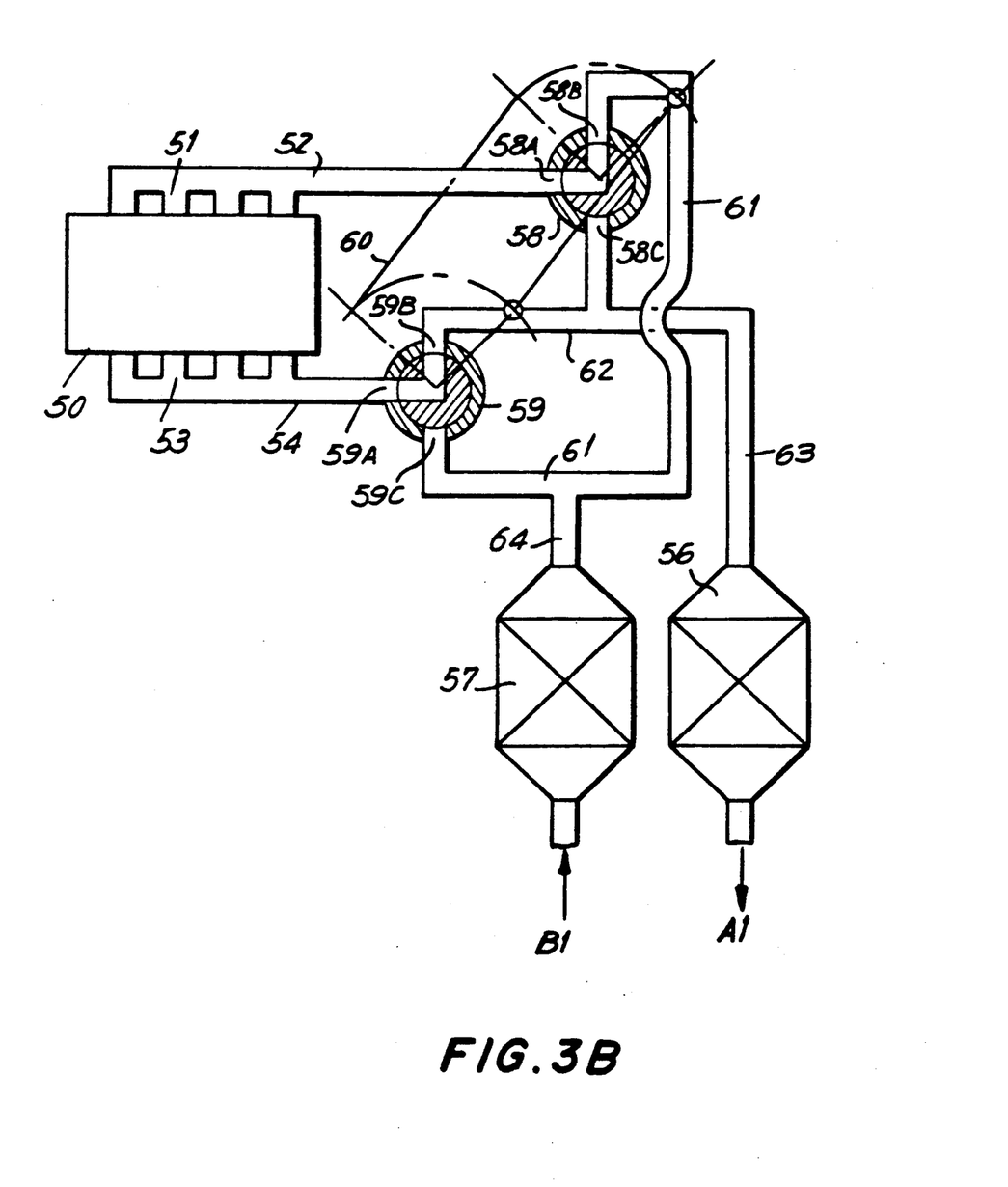

In the embodiment illustrated in FIGS. 3A and 3B the invention is applied to a naturally-aspirated Diesel engine, i.e., one with no pressure charging of the intake air. The engine 50 has an inlet manifold 51 connected to a main inlet air duct 52 and an exhaust manifold 53 connected to a main exhaust gas duct 54. Two filters 56 and 57 are provided.

The filter units are fabricated of cordierite and have the following features: mean pore size—12 um; cell density—100 cells per in$^2$; average wall thickness—17 mils; porosity—52/56%; coefficient of thermal expansion—9.5/11.0×10$^{-7}$ in/in/°C. (25°-1000° C.); and compressive strength—1130 psi, 250 psi, 15 psi along the longitudinal, lateral, and diagonal axis, respectively. Solid particulate matter contained initially in the exhaust is trapped in the filter zone of each unit when that exhaust flows through such zone.

Two three-port two-way rotating cocks 58 and 59 have their main ports 58A, 59A connected respectively to the main inlet duct 52 and to the main exhaust duct 54 as shown, the two cocks having their rotating members coupled together for simultaneous operation as indicated diagrammatically at 60. One branch port 58B of the cock 58 is connected by a cross-connection pipe 61 to one other branch port 59C of cock 59; and the other branch port 58C of cock 58 is connected by a cross-connection pipe 62 to the other branch port 59B of cock 59. One filter unit 56 is connected at one end by a pipe 63 to the cross-connection pipe 62, the other end of the filter unit 56 being open either directly or through an associated silencer device to the atmosphere. The second filter unit 57 is connected at one end by a pipe 64 to the other cross-connection pipe 61, and once again the other end of the filter 57 is open either directly or through an associated silencer device to the atmosphere. By operation of the ganged cocks 58 and 59, each filter 56 and 57 may be operated either as an exhaust gas filter, or placed in the inlet air stream with the direction of flow through the filter element reversed.

Thus with the cocks 58 and 59 in the positions shown in FIG. 3A, inlet air will be drawn into the open end of the filter 56 and will pass through the filter, in the direction indicated by the arrow A, and then by way of pipes 63 and 62, cock 58 and pipe 52 to the inlet manifold 51. The exhaust gas from the exhaust manifold 53 will travel via pipe 54, cock 59, and pipes 61 and 64 to the second filter 57, through which it will pass to the atmosphere as indicated by the arrow B. Deposits of carbonaceous matter will be intercepted by the element of the filter unit 57 and will collect on its upstream side.

After a preselected time-period of exhaust flow through the filter—chosen to be sufficiently short so that trapped particulate is "fresh", i.e. has not become infeasibly resistant to combustion, in this case after one hour—the two cocks are turned simultaneously by the mechanism 60 into the positions shown in FIG. 3B, reversing the directions of gas flow through filters 56 and 57. Typically, the means by which the "turning" of cocks 58 and 59 is effected is an associated microprocessor control system (not shown for purposes of simplicity). The pre-selected time period, having been determined previously, is programmed into the memory of the microprocessor control system. When the time period expires the control system commands the movement of mechanism 60 which causes rotation of the cocks, thereby interrupting exhaust flow to the filter in question. However, it is readily appreciated that the invention is not limited to the use of such a microprocessor control system, and that any way of (and any apparatus for) accomplishing the desired effect is suitable so long as it does not interfere with achievement of the invention's objects.

At this point, the exhaust gases from the manifold 53 flow via the pipe 54, cock 59, pipes 62 and 63 to the filter 56, in which they will be filtered before being discharged to the atmosphere in the direction of the arrow A1. The inlet air enters the filter 57 in the direction shown by the arrow B1, and passes via pipes 64 and 61, cock 58 and inlet duct 52 to the inlet manifold 51. The air flow through the filter unit 57 is in the reverse direction to that of the previously-filtered exhaust gases, so that the partially-blocked filter element of the filter 57 has the inlet air drawn through it in the reverse direction "backflushing" the filter so as to dislodge collected material from the now-downstream face of the filter element and carrying the dislodged material along into the inlet manifold 11 and thence into the engine where it will be combusted. In this way the filter element of the filter 57 will be cleared, or regenerated, by the reversed flow of inlet air through it, while simultaneously the other and initially-clean filter 56 is in use to filter the exhaust gases and collect particulate material from them. Because the particulate matter removed from filter 57 is "fresh", the disposal of that particulate matter is efficient and substantially complete thereby to eliminate problems stemming from its release into the atmosphere.

Subsequently, the cocks 58 and 59 will be changed over again to switch the flow direction and initiate another cycle of operation, which will be repeated periodically.

While two separate three-port two-way cocks 58 and 59 separately installed but coupled together are shown in FIGS. 3A and 3B for clarity and simplicity, in practice the cocks can be arranged in axial alignment and with a common rotary member, or any other convenient valving arrangement may be used. Any known arrangement of flow-switching valves and piping may be employed, including the use of electrically-operated solenoid valves.

Figure 4A:
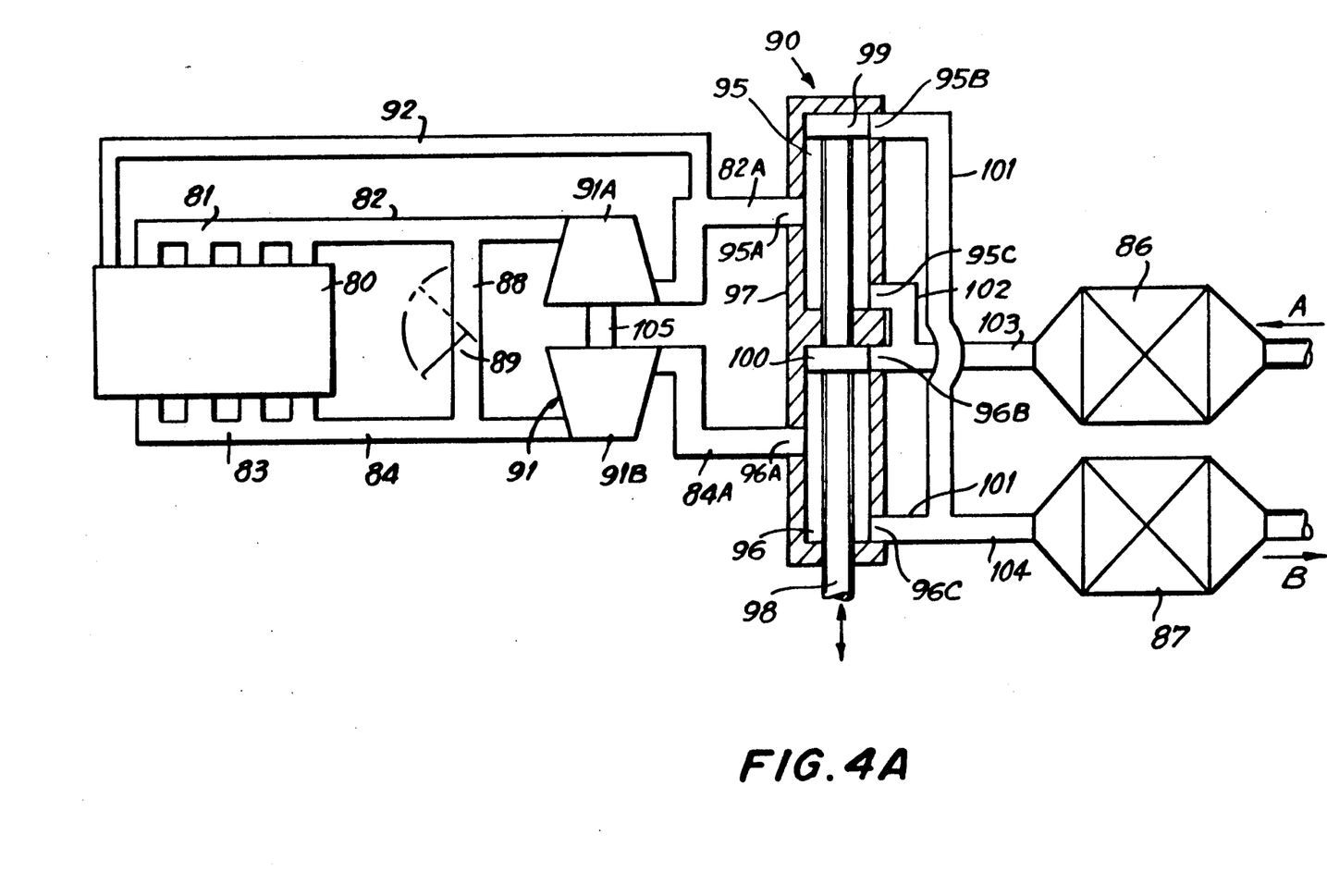
FIG. 4 illustrates another continuous backflushing embodiment in accordance with the present invention.
Figure 4B:
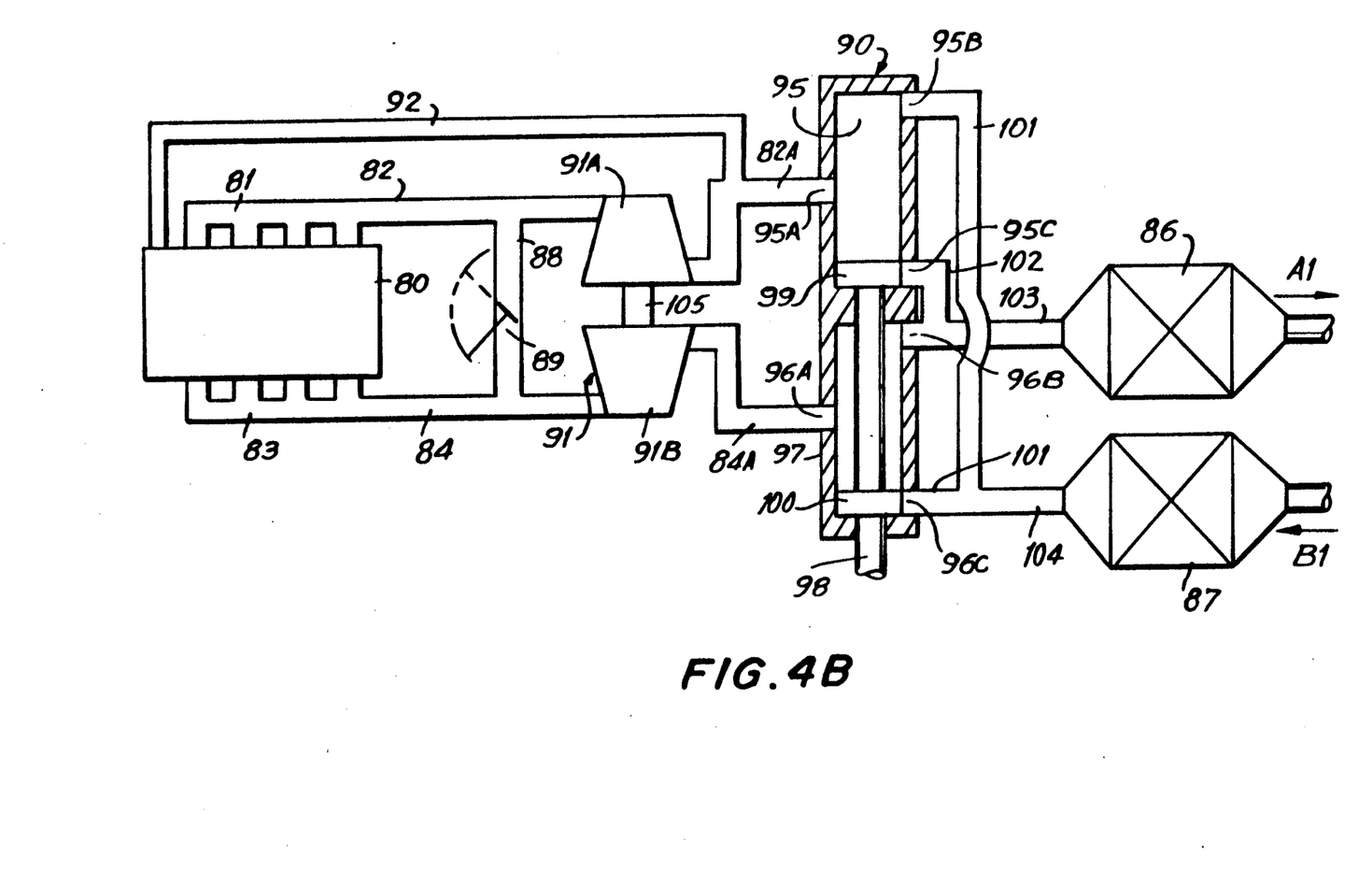

FIGS. 4A and 4B show an embodiment of the invention in its application to a turbocharged Diesel engine. The engine 80 has an inlet manifold 81 connected to a main inlet air duct 82 and an exhaust manifold 83 connected to a main exhaust gas duct 84. Two filters 86 and 87 are provided.

The filter elements are fabricated of cordierite and have the same features as the filter elements shown in FIG. 1. Solid particulate matter contained initially in the exhaust is trapped in the filter zone of each unit when that exhaust flows through such zone. The gas flow switching means is a double spool valve 90 and the turbo-compressor 91 shown diagrammatically, is positioned between the mainifolds 81, 83 and the spool valve 94 and filters 86, 87. An EGR cross-connection pipe 88 and control valve 89 are shown for use if required and an additional pipe 92 is shown connecting the main inlet pipe 82 on the intake side of the air compressor 91A to the engine crankcase, for use in an emission-controlled engine. This is standard practice for ensuring that any blowback of gases past the pistons or valve stems of the engine, which will contain unburnt hydrocarbons, etc., is passed back through the engine and combusted instead of being released into the atmosphere.

The spool valve 90 has two valve chambers 95, 96 in a common valve housing 97, and a single valve spool 98 common to both chambers and having one land 99 in the valve chamber 95, for cooperation with the valve ports 95B and 95C, and a second land 100 in the valve chamber 96 for cooperation with the valve ports 96B, 96C. The portion 82A of the main engine inlet duct 82 on the intake side of the compressor 91A is connected to the main port 95A of valve chamber 95, the portion 84A of the main engine exhaust duct 84 on the exhaust side of the exhaust turbine 91B is connected to the main port 96A of valve chamber 96, the pipe interconnects the ports 95B and 96C, the pipe 100 interconnects the ports 95C and 96B, and the filter units 86 and 87 are connected to the pipes 102 and 101 by pipes 103 and 104 respectively.

FIG. 4A shows the system with the valve spool 98 in one operative position in which the inlet air is drawn in through the filter unit 16, as indicated by the arrow A and passes via pipes 103 and 102 to port 95C, through valve chamber 95 to port 95A, and then through the inlet pipe portion 82A to the intake of the compressor 91A to be compressed and delivered to the inlet manifold 81 through the duct 82, while the exhaust gas from the manifold 83 drives the exhaust gas turbine 91B (the rotor of which is connected by a shaft 105 to the compressor rotor 91A), and passes then via pipe 84A, port 96A, chamber 96, port 96C and pipes 101 and 104 to the other filter unit 87 to be filtered and discharged to the atmosphere as shown by the arrow B.

When the spool 38 is moved to its other operating position as shown in FIG. 4B, in response to the command of a microprocessor control system of the type discussed in connection with FIGS. 3A and 3B, the gas flow through the filters is reversed. The exhaust gas is switched to the filter unit 86 to be filtered thereby and to emerge in the direction of arrow A1, while the inlet air is drawn in through filter 87 (arrow B1) and passes through that filter to "backflush" and clean its filter element. The dislodged solid matter in "fresh" condition is carried by the inlet air flow through the pipe 104 and the pipe 101, the valve chamber 95, the pipe portion 82A and the compressor 91A to the duct 82 and the inlet manifold 81 to be combusted in the engine.

In each of the illustrated embodiments described above, in which the exhaust gas flow is switched cyclically between the filters 86 and 87, it is possible to provide duplicate silencers respectively for the filters 86 and 87 to ensure adequate silencing of the exhaust gas flow whichever filter it is discharged from. The inlet air will then be drawn in through the other silencer. Alternatively a single silencer only may be provided, in conjunction with a suitable change-over valve arrangement arranged to connect it to whichever filter is in use to filter the exhaust gas flow. This change-over valve may be operated simultaneously with the switching of the change-over cocks or spool valves, and by the same operating mechanism.

Figure 5:
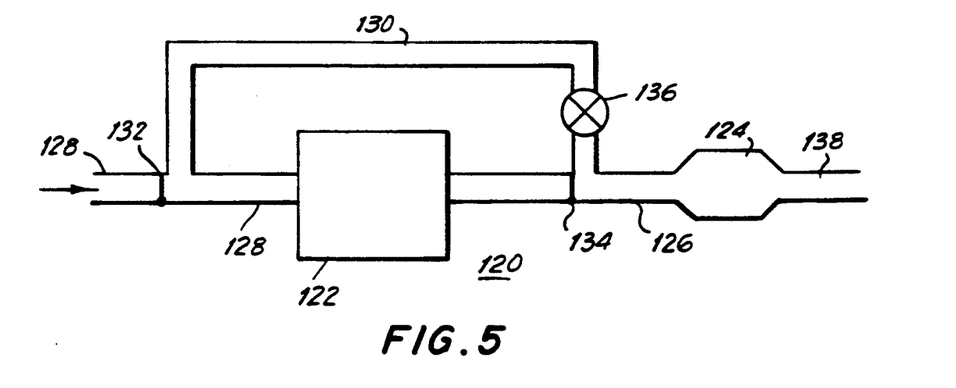
FIG. 5 is a schematic illustration of yet another embodiment of the invention, this time a diesel engine exhaust gas filter arrangement employing pulsed backflushing, adapted for recycling to the engine for incineration of "fresh" solid particulate removed from the exhaust.

Yet another embodiment 120 is illustrated in FIG. 5. A diesel engine 122 is connected to trap 124 by line 126. Intake line 128 leads from the ambient atmosphere to engine 122, to provide ambient air for combustion within the engine. Line 130 is connected to line 126 and to line 128 to provide an alternate flow path around the engine. Valve 132 is positioned across line 128, and is movable from an open position permitting flow through the line, to a closed position interrupting flow. Valve 134 is positioned across line 126, and is movable between an open position permitting flow through the line and a closed position preventing such flow. Line 130 is connected to line 128 between valve 132 and the engine, and is connected to line 126 between valve 134 and the trap 124. The desired time period of exhaust flow through trap 124 such that trapped particulate is maintained in a "fresh" condition has previously been determined and stored in the memory of a microprocessor control system which directs the operation of the valves 132 and 134 (in, for instance, an automotive vehicle this microprocessor control system is typically adapted to control many other operational features of the vehicle as well). When the time period expires, valves 132 and 134—which are normally open to permit intake flow to the engine and transportation of the exhaust stream to the trap for filtration—are simultaneously closed in response to a command from the microprocessor control system. This can be accomplished by actuating a solenoid on each valve or in any other conventional manner which is consistent with the practice of the present invention. Valve 136 is positioned across line 130, and is movable between an open position permitting flow through line and a closed position preventing flow. When valves 132 and 134 are closed the engine quickly reduces the pressure in the volume of line between the engine and valve 144. During this time, exhaust from the engine is accumulated in the volume of line between the engine and valve 134.

Valve 136 is an automatic valve that opens when the pressure differential across it reaches a predetermined value. When valve 136 opens in response to the drawing down of pressure by the engine in line 130 (valve 136 opens very quickly) ambient air flows through line 138, trap 124, and line 126 in a direction opposite that of normal exhaust flow, and then through line 130 and line 128, and eventually to engine 122. This surge of gas constitutes a pulsed backflushing of trap 124, which surge carries particles dislodged from the trap in "fresh" condition back to the engine for incineration.

Valves 132 and 134 open in response to valve 136's automatic opening, after a suitable delay. Valve 136 automatically closes after the pressure differential across it is removed, and the system is restored to its original condition. The entire cleaning sequence is completed in less than one second, and preferably less than 0.25 seconds. Indeed, regeneration periods of no more than one second, and preferably no more than 0.25 seconds, are advantageously employed in many other embodiments of the invention also.

Figure 6:
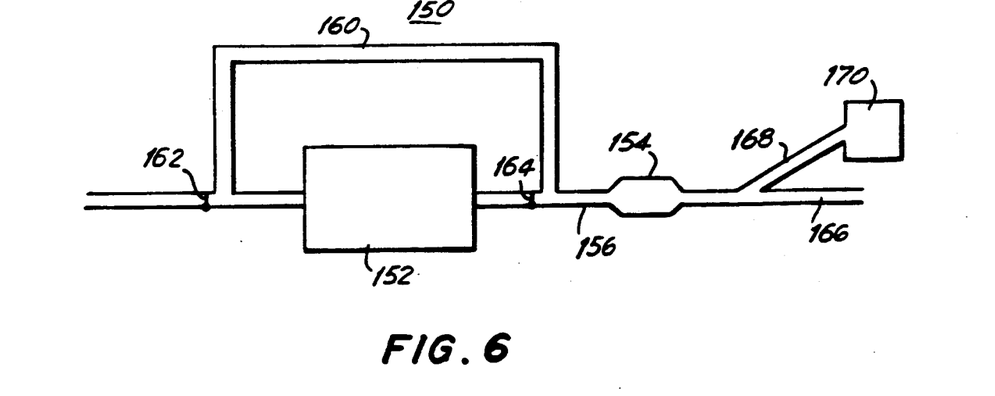
FIG. 6 is a schematic illustration of an alternative embodiment of the invention in which pulsed backflushing is carried out with compressed air.

Yet another embodiment is illustrated in FIG. 6. A filtered system 150 includes diesel engine 152 connected to trap 154 by line 156. Intake line 158 leads from the ambient atmosphere to engine 152, to provide ambient air for combustion within the engine. Line 160 is connected to line 156 and to line 158 to provide an alternate flow path around the engine. Valve 162 is positioned across line 158, and is movable from an open position permitting flow through the line, to a closed position interrupting flow. Valve 164 is positioned across line 156, and is movable between an open position permitting flow through the line and a closed position preventing such flow. Line 160 is connected to line 158 between valve 162 and engine 152, and is connected to line 156 between valve 164 and trap 154. The operation of valves 162 and 164 is governed by a microprocessor control system of the type mentioned in connection with the apparatus of FIG. 5. When the time programmed for exhaust flow through the trap has expired, valves 162 and 164—which are normally open to permit intake flow to the engine and transportation of the exhaust stream to the trap for filtration—are simultaneously closed in response to a command from the microprocessor control system. Again, this can be accomplished by actuating a solenoid on each valve, or in any other conventional manner which is consistent with the practice of the present invention. After a suitable but short delay a pulse of compressed air is released from source 170 in response to a command from the appropriately programmed microprocessor control system, and is injected through line 168 into line 166, through trap 154 and lines 156, 160 and 158 into engine 152. This surge of air constitutes a pulsed backflushing of trap 154, which surge carries particles dislodged from the trap in "fresh" condition back to the engine for incineration. During this time, exhaust from the engine is accumulated in the volume of line between the engine and valve 164.

In response to another command from the microprocessor control system, valves 162 and 164 open a suitable time after injection of the compressed air pulse, and normal exhaust flow through trap 154 is resumed. The entire cleaning sequence is completed in less than one second, and preferably less than 0.25 seconds.

Figure 7:
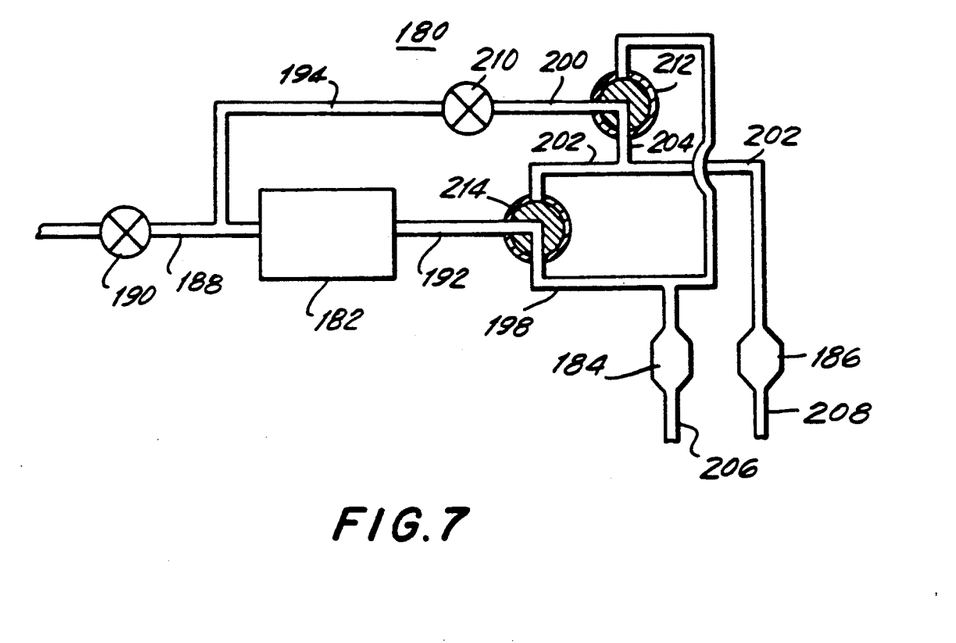
FIG. 7 is a schematic illustration of still another alternative embodiment of the invention in which two filter zones are regenerated employing pulsed backflushing.

A still further embodiment of the invention is illustrated in FIG. 7. A filtered system 180 includes diesel engine 182 connected alternately to trap 184 by lines 192 and 198 and to trap 186 by lines 192 and 202. Intake line 188 leads from the ambient atmosphere to engine 182, to provide ambient air for combustion within the engine; valve 190 is positioned across line 188 and is movable between open and closed states permitting and interrupting flow, respectively. Line 194 is connected to line 188 and to line 200 which is connected to line 202, to provide an alternate flow path around the engine. Line 192 connects with valve (i.e., cock) 214, which is movable to direct flow into either line 198 or 202 while closing off flow to the other. Line 200 connects to valve (i.e., cock) 212, which is movable to direct flow from either line 198 or 204 into line 200, and to close off flow from the line not selected. Line 194 is connected to line 188 between valve 190 and the engine.

Valves 212 and 214 are operated in response to commands from a microprocessor system of the sort discussed in connection with FIG. 5.

Assume trap 184 is filtering exhaust. When the time period for exhaust flow through the trap (as programmed into the memory of the microprocessor control system) expires, valves 214 and 212—which have been oriented to permit transportation of the exhaust stream to trap 184 for filtration and drawing of air through trap 186, lines 202, 204, 200 and 194, and line 188 back to the engine—are moved simultaneously in response to a command from the control system. That is, the valves are moved so that exhaust flows through lines 192 and 202 to trap 186, and then into line 208 to the atmosphere while flow from the atmosphere through trap 184, lines 198, 200 and 194, and line 188 back to the engine is permitted. Periodically valve 190 is closed. Valve 210 is positioned across line 200, and is movable between an open position permitting flow through the line and a closed position preventing flow. When valve 190 is closed the engine quickly reduces the pressure in the volume of line between the engine and valve 210, which is normally closed.

Valve 210 is an automatic valve that opens when the pressure differential across it reaches a predetermined value. When valve 210 opens in response to the drawing down of pressure by the engine in line 194 (valve 210 opens very quickly) ambient air flows through line 206, trap 184, line 198, line 200 and line 194, and eventually (through line 188) to the engine. This surge of gas constitutes a pulsed backflushing of trap 184, which surge carries particles dislodged from the trap in "fresh" condition back to the engine for incineration.

When valve 190 is opened, valve 210 automatically closes after the pressure differential across it is removed, and the system is restored to its initial condition. The entire cleaning sequence is completed in less than one second, and preferably less than 0.25 seconds. In some embodiments each trap is cleaned by a plurality of such sequences. When trap 186 needs regeneration, valves 212 and 214 are operated in response to a command from the microprocessor control system to direct exhaust to trap 184 and permit backflushing of trap 186 in like manner. It can be readily appreciated from the foregoing example that numerous alternative systems containing a plurality of filter zones are configurable depending on the needs of the practitioner and his environmental constraints.

Thus, the present invention provides method and apparatus for trapping solid particulate matter in the exhaust of a diesel engine, and in turn removing that particulate from the trap and sending it to the engine for combustion in a "fresh" state which maximizes the efficiency of that combustion. In this manner, a relatively simple and commercially feasible disposal of the trapped particulate is effected. This confers significant operational economies, while at the same time preventing environmental problems stemming from release of such particulate into the atmosphere.

The terms and expressions which have been employed are used as terms of description and not of limitation, and there is no intention in the use of such terms and expressions of excluding any equivalents of the features shown and described or portions thereof, its being recognized that various modifications are possible within the scope of the invention.

What is claimed is:

1. A method for removing solid particulate matter from the exhaust of a diesel engine, which comprises
    passing the engine's exhaust flow through at least a part of filter means to trap solid particulate matter contained initially in the exhaust, thereby to remove said matter from said exhaust flow, said filter means containing no more than one filter zone, and
    intermittently cleaning at least said part of the filter means by
        interrupting the exhaust flow through at least said part of the filter means and
        backflushing at least said part of the filter means during said interruption to dislodge said solid particulate matter from the filter means and entrain it for the purposes of removing it form said filter means
    wherein
        the elapsed time between backflushings is less than the duration of time needed for the trapped solid particulate matter to become resistant to combustion and
    wherein said elapsed time between backflushings is of a duration of no more than 10 minutes.

2. A method in accordance with claim 1, wherein the dislodged solid particulate matter is transported to the intake of said engine.

3. A method as claimed in claim 1, wherein the method further comprises the step of passing, during said interruption, at least one backflush fluid pulse through at least said part of the filter means.

4. A method as claimed in claim 1, wherein the said filter means comprises a ceramic honeycomb filter material, sintered metal particles, metal mesh, ceramic fiber, ceramic foam or a granular bed.

5. A method as claimed in claim 4, wherein the said filter means includes a ceramic honeycomb filter material fabricated of cordierite.

6. Apparatus for decreasing exhaust emission in a diesel engine, the apparatus comprising
    filter means adapted to intercept the engine's exhaust flow and which traps solid particulate matter contained initially in the exhaust when the exhaust flow through at least a part of said filter means, thereby to remove said matter from said exhaust flow, said filter means containing no more than one filter zone,
    means for intermittently cleaning at least said part of said filter means including
        means for interrupting the exhaust flow through at least said part of the filter means and means for passing during said interruption, backflush fluid through at least said part of the filter means thereby to dislodge from the filter means, and entrain, said solid particulate matter for the purpose of removing it from said filter means
    characterized in that
        means are provided such that the elapsed time between backflushings is less than the duration of time needed for the trapped solid particulate matter to become resistant to combustion and
    wherein said elapsed time between backflushings is of a duration of no more than 10 minutes.

7. Apparatus as claimed in claim 6, wherein the apparatus further comprises means for transporting said dislodged solid particulate matter to the intake of said engine.

8. Apparatus as claimed in claim 6, wherein the apparatus further comprises means for passing, during said interruption, at least one backflush fluid pulse through at least said part of the filter means.

9. Apparatus as claimed claim 6, wherein the said filter means comprises a ceramic honeycomb filter material, sintered metal particles, metal mesh, ceramic fiber, ceramic foam or a granular bed.

10. Apparatus as claimed in claim 9 wherein the said filter means includes a ceramic honeycomb filter material fabricated in cordierite.

* * * * *